United States Patent
Hitnalli et al.

(10) Patent No.: US 12,263,816 B1
(45) Date of Patent: Apr. 1, 2025

(54) ADJUSTABLE BLADE LOAD MECHANISM FOR WIPER ARM ASSEMBLY

(71) Applicant: Rosemount Aerospace Inc., Burnsville, MN (US)

(72) Inventors: Vishwanath Hitnalli, Bangalore (IN); Phani Srinivas Nouduri, Karnataka (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 18/436,638

(22) Filed: Feb. 8, 2024

(30) Foreign Application Priority Data

Dec. 22, 2023 (IN) .............................. 202341088082

(51) Int. Cl.
*B60S 1/34* (2006.01)
*B64C 1/14* (2006.01)

(52) U.S. Cl.
CPC ........... *B60S 1/3418* (2013.01); *B60S 1/3443* (2013.01); *B60S 1/3459* (2013.01); *B60S 1/3463* (2013.01); *B60S 1/3488* (2013.01); *B64C 1/14* (2013.01)

(58) Field of Classification Search
CPC ........ B60S 1/34; B60S 1/3463; B60S 1/3472; B60S 1/3411; B60S 1/3418; B60S 1/3413; B60S 1/3443; B60S 1/3459; B60S 1/3488; B64C 1/14
USPC ...................................................... 15/250.34
See application file for complete search history.

(56) References Cited

U.S. PATENT DOCUMENTS

| | | | |
|---|---|---|---|
| 2,376,012 A | 5/1945 | Sacchini | |
| 2,493,527 A * | 1/1950 | Carey | ........................ B60S 1/34 411/964 |
| 2,994,900 A * | 8/1961 | Smithers | ................ B60S 1/3418 403/53 |
| 4,698,872 A | 10/1987 | Watanabe | |
| 5,822,827 A | 10/1998 | Dimatteo et al. | |

FOREIGN PATENT DOCUMENTS

| | | |
|---|---|---|
| DE | 3841137 A1 | 6/1990 |
| DE | 4429608 A1 | 2/1996 |

* cited by examiner

*Primary Examiner* — Gary K. Graham
(74) *Attorney, Agent, or Firm* — Kinney & Lange, P.A.

(57) ABSTRACT

A windshield wiper system for an aircraft includes a wiper drive shaft with a first end and a second end opposite the first end. The second end includes a first threaded section between the first end and the second end, a second threaded section extending axially along the wiper drive shaft between the first threaded section and the second end relative to a center axis of the wiper drive shaft, and a spline section axially between the first threaded section and the second threaded section. Further included is a first nut to thread to the first threaded section, a second nut to thread to the second threaded section, and a wiper arm assembly including an adjustment sleeve configured to interlock with the spline section, a wiper arm with a first end configured to enclose the adjustment sleeve, and a second end of the wiper arm attached to a wiper blade.

20 Claims, 5 Drawing Sheets

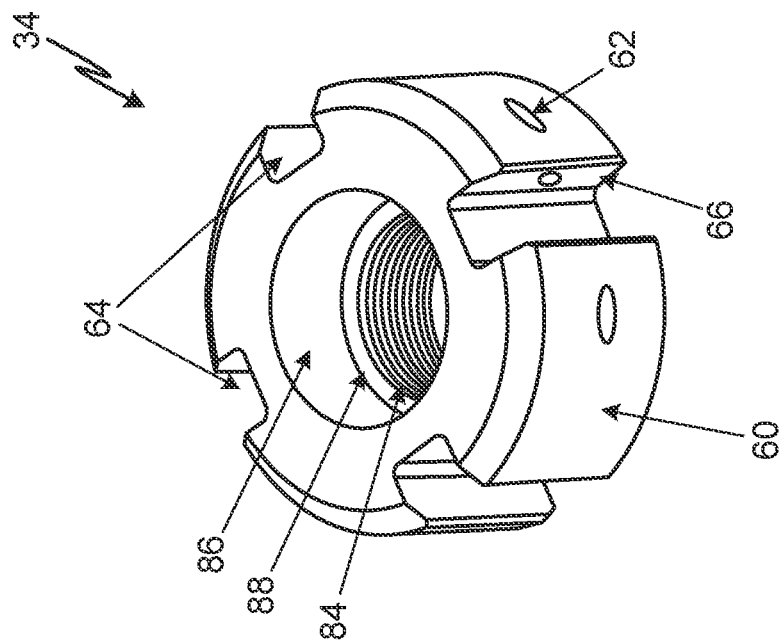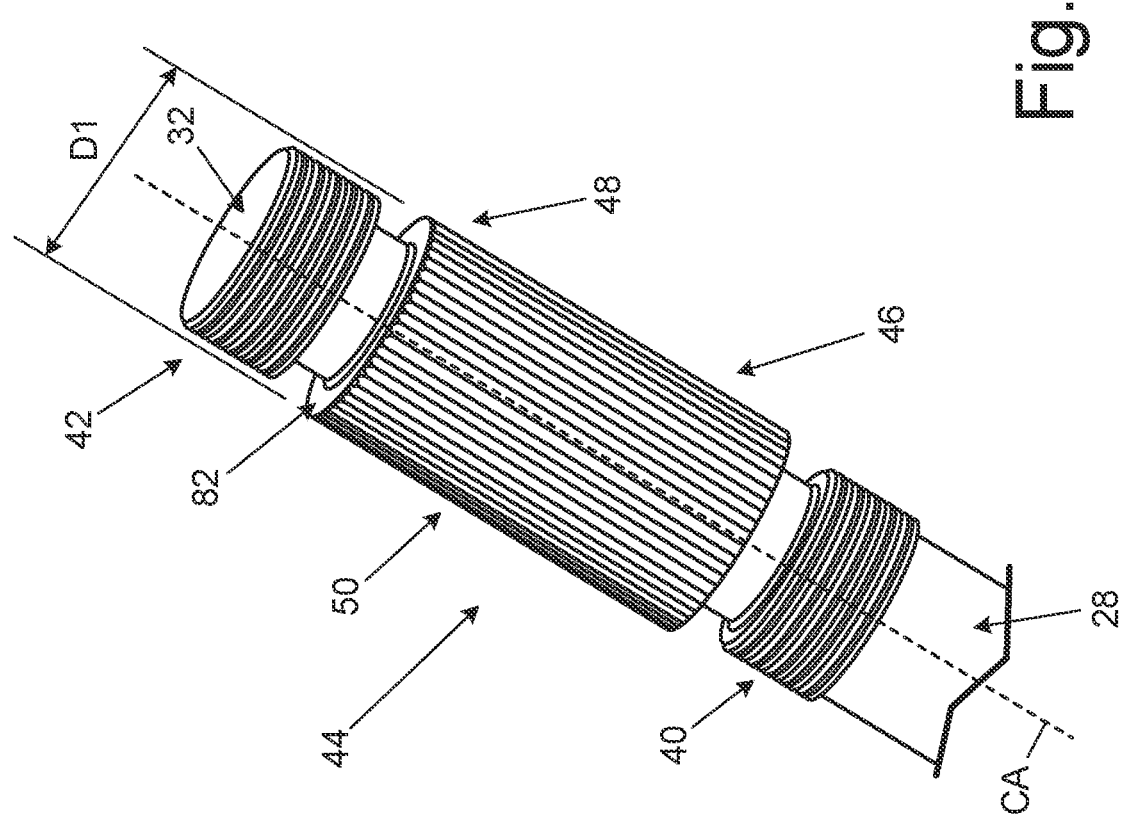
Fig. 5

ADJUSTABLE BLADE LOAD MECHANISM FOR WIPER ARM ASSEMBLY

CROSS-REFERENCE TO RELATED APPLICATION(S)

This application claims the benefit of Indian Provisional Application No. 20/2341088082, filed Dec. 22, 2023 for "ADJUSTABLE BLADE LOAD MECHANISM FOR WIPER ARM ASSEMBLY" by V. Hitnalli and P. S. Nouduri.

BACKGROUND

The present disclosure relates to windshield wiper systems, and in particular windshield wiper systems used on an aircraft.

Aircraft windshield wiper systems are used to remove water and debris from windshields of aircrafts, increasing visibility for pilots. Windshield wiper systems include a wiper drive shaft connected to a power source, a wiper arm, and a wiper blade used to contact the windshield. The windshield wiper system is held into contact with the windshield by a force exerted by the wiper arm known as the "blade load". This blade load is a key parameter which determines the wipe quality. In conventional wiper systems, the wiper systems do not always have a mechanism for adjusting the blade load, and those wiper systems that do have a mechanism for adjusting blade load often have increased aerodynamic drag and build complexity.

SUMMARY

According to one aspect of the disclosure, a windshield wiper system is disclosed. The windshield wiper system includes a wiper drive shaft with a first end and a second end. The second end includes a first threaded section between the first end and the second end, a second threaded section extending axially along the wiper drive shaft between the first threaded section and the second end relative to a center axis of the wiper drive shaft, and a spline section axially between the first threaded section and the second threaded section. A first nut is configured to thread onto the first threaded section, and a second nut is configured to thread onto the second threaded section. A wiper arm assembly includes an adjustment sleeve that interlocks to the spline section. The wiper arm assembly includes a first end that encloses the adjustment sleeve. A second end of the wiper arm is attached to a wiper blade.

In another aspect of this disclosure, a windshield wiper system for an aircraft includes a wiper drive shaft with a first end and a second end that is opposite the first end and spaced axially from the first end relative to a center axis of the wiper drive shaft. The second end further includes a first threaded section between the first end and the second end, a second threaded section axially between the first threaded section and the second end, and a spline section between the first threaded section and the second threaded section. The spline section may include a plurality of splines extending axially along the wiper drive shaft relative to the center axis of the wiper drive shaft, a first stop face at a first end of the plurality of splines and oriented perpendicular to the center axis of the wiper drive shaft, and a second stop face at a second end of the plurality of splines and oriented perpendicular to the center axis of the wiper drive shaft. A first nut may be configured to thread to the first threaded section and includes a first stop shelf configured to contact the first stop face. A second nut may be configured to thread to the second threaded section and includes a second stop shelf configured to contact the second stop face. A wiper arm assembly may include an adjustment sleeve configured to contact the plurality of splines, a wiper arm with a first end configured to enclose the adjustment sleeve, and a second end of the wiper arm is attached to a wiper blade.

BRIEF DESCRIPTION OF THE DRAWINGS

FIG. 5 is a perspective view of the first nut and the wiper drive shaft with a first threaded section, a spline section, and a second threaded section.

DETAILED DESCRIPTION

Figure 1:
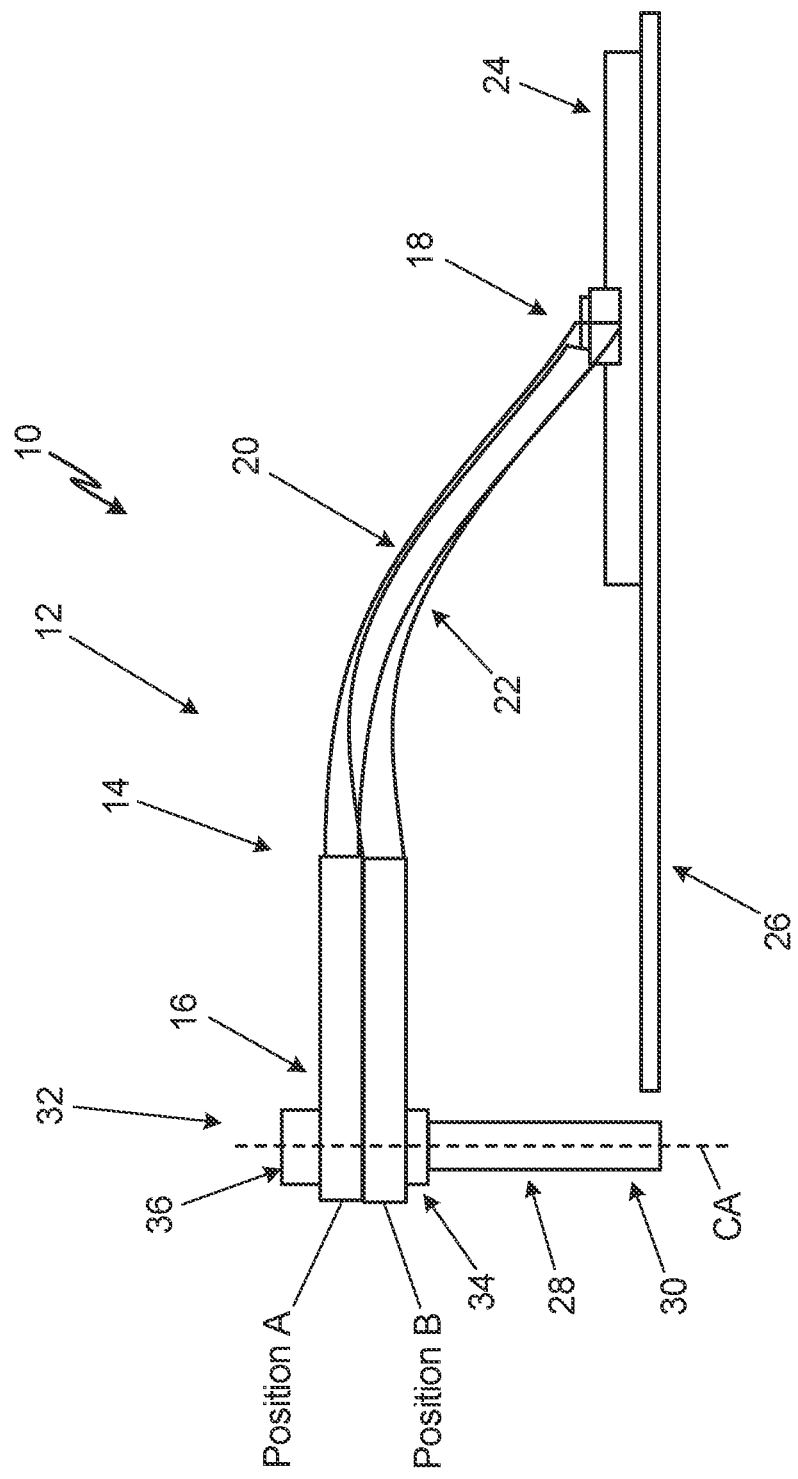
FIG. 1 is a side view of a windshield wiper system with a maximum blade load position and a minimum blade load position.

FIG. 1 is a side view of windshield wiper system 10 on windshield 26 of an aircraft (not pictured). Hereinafter, windshield wiper system 10 will be referred to as WWS 10. WWS 10 includes wiper arm assembly 12. Wiper arm assembly 12 includes wiper arm 14 with first end 16 and second end 18, wiper arm minimum blade load position 20, wiper arm maximum blade load position 22, wiper blade 24 (which is in contact with windshield 26), wiper drive shaft 28 with first end 30 and second end 32, first nut 34, and second nut 36. WWS 10 is installed on the aircraft and WWS 10 is configured to clear windshield 26 of rain or debris.

Wiper drive shaft 28 is coupled to a drive mechanism (not shown) at a first end 30, such as an electric motor. First nut 34, first end 16 of wiper arm 14, and second nut 36 are coupled to second end 32 of wiper drive shaft 28. First end 16 of wiper arm 14 is between first nut 34 and second nut 36. Wiper arm 14 bows and curves toward windshield 26 as wiper arm 14 extends from first end 16 to second end 18. Wiper blade 24 is connected to second end 18 of wiper arm 14 and contacts windshield 26. The curvature and bow in wiper arm 14 can function as a spring that exerts a force, also known as blade load, on wiper blade 24 that presses wiper blade 24 against windshield 26. In other embodiments, the wiper arm may be straight without bows and curves, and the blade load may still be adjusted. Conventional wiper systems use springs or Belleville washers to increase blade load. The blade load pressing wiper blade 24 against windshield 26 ensures wiper blade 24 remains in contact with windshield 26 throughout operation of WWS 10. During operation of WWS 10, wiper drive shaft 28 rotates about central axis CA, providing rotational energy to first end 16 of wiper arm 14 which moves wiper blade 24 connected to second end 18 of wiper arm 14 across windshield 26.

The blade load wiper arm assembly 12 exerts on wiper blade 24 and windshield 26 can be adjusted by adjusting a position of first end 16 of wiper arm 14 on second end 32 of wiper drive shaft 28. Wiper arm maximum blade load position 22 shown in FIG. 1 represents a position of wiper arm 14 where a maximum blade load is applied to wiper blade 24 and windshield 26. Wiper arm minimum blade load position 20 shown in FIG. 1 represents a position of wiper arm 14 where a minimum blade load is applied to wiper blade 24 and windshield 26. Though FIG. 1 shows both wiper arm minimum blade load position 20 and wiper arm maximum blade load position 22, during operation of windshield wiper system 10, wiper arm assembly 12 will only be at one of minimum blade load position 20, wiper arm maximum blade load position 22, or a position therebetween. When first nut 34 and second nut 36 are adjusted up and down axially along wiper drive shaft 28, wiper arm 14 will move between wiper arm minimum blade load position 20 and wiper arm maximum blade load position 22. These positions are noted to not be binary, as any position in between wiper arm minimum blade load position 20 and wiper arm maximum blade load position 22 may be used to vary the blade load of WWS 10.

Figure 2:
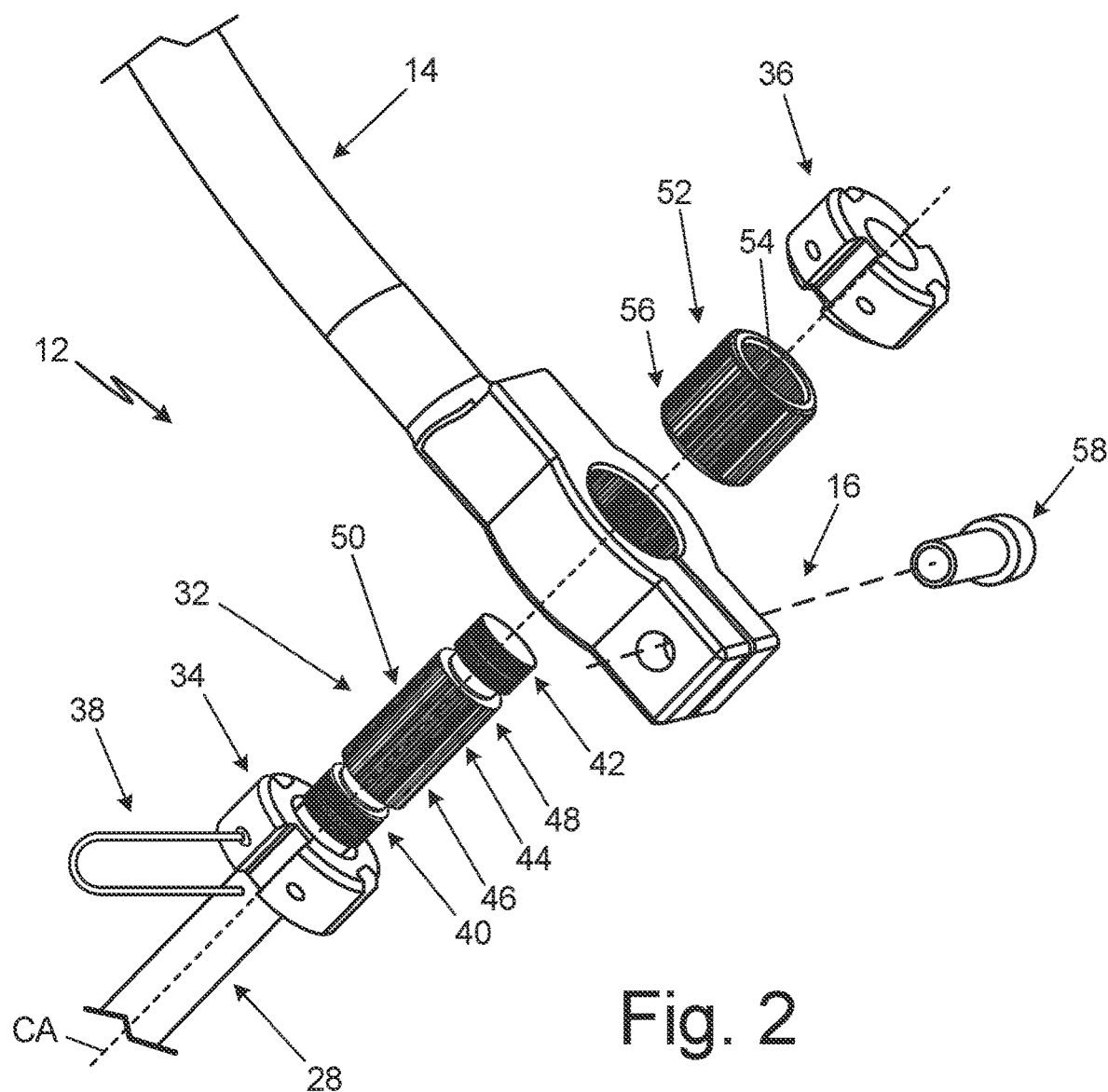
FIG. 2 is an exploded view of the windshield wiper system.

FIG. 2 is an exploded view of a portion of wiper arm assembly 12 showing first end 16 of wiper arm 14, second end 32 of wiper drive shaft 28, first nut 34, second nut 36, and lock wire 38. As shown in FIG. 2, second end 32 of wiper drive shaft 28 includes first threaded section 40, second threaded section 42, and spline section 44. Spline section 44 includes a plurality of splines 50, a first end 46, and a second end 48. Wiper arm assembly 12 can further include adjustment sleeve 52 with internal splines 54 and external splines 56. Wiper arm assembly 12 can also include arm bolt 58.

Wiper arm 14 is coupled to wiper drive shaft 28 with adjustment sleeve 52 that has both internal splines 54 and external splines 56. Spline section 44 can be integrally formed on second end 32 of wiper drive shaft 28 and can be inserted into adjustment sleeve 52 such that splines 50 of spline section 44 can mesh with internal splines 54 of adjustment sleeve 52. Adjustment sleeve 52 is inserted into first end 16 of wiper arm 14 such that external splines 56 mesh with internal splines formed in first end 16 to rotationally couple first end 16 of wiper arm 14 to second end 32 of wiper drive shaft 28. Arm bolt 58 can be threaded into first end 16 of wiper arm 14 to apply a compressive load first end 16 of wiper arm 14 to reduce slippage between spline section 44 and adjustment sleeve 52 and reduce slippage between adjustment sleeve 52 and first end 16 of wiper arm 14.

While spline section 44 and adjustment sleeve 52 rotationally connect first end 16 of wiper arm 14 to second end 32 of wiper drive shaft 28 such that wiper arm 14 will rotate with wiper drive shaft 28, first nut 34, second nut 36, first threaded section 40, and second threaded section 42 axially position first end 16 of wiper arm 14 on second end 32 of wiper drive shaft 28. First end 16 of wiper arm 14 is configured to move axially along central axis CA of wiper drive shaft 28. First nut 34 is threaded onto first threaded section 40 of wiper drive shaft 28. Second nut 36 is threaded onto second threaded section 42 of wiper drive shaft 28. First end 16 of wiper arm 14 is axially between first nut 34 and second nut 36. Spline section 44 is longer than adjustment sleeve 52, allowing first end 16 of wiper arm 14 to move axially when first nut 34 and second nut 36 are threaded on first threaded section 40 and second threaded section 42 respectively. Moving axially up and down on wiper drive shaft 28 towards second end 32 of wiper drive shaft 28 varies blade load of wiper blade 24. This puts varying pressure on windshield 26 depending on the positioning of the wiper arm 14. When first end 16 is axially positioned on spline section 44 to provide the desired pressure and blade load on wiper blade 24 and windshield 26, first nut 34 is rotated on first threaded section 40 until first nut 34 contacts first end 16 of wiper arm 14, and second nut 36 is rotated on second threaded section 42 until second nut 36 contacts first end 16 of wiper arm 14, such that first end 16 is sandwiched between first nut 34 and second nut 36. To further secure first end 16 of wiper arm 14 in place on second end 32 of wiper drive shaft 28, lock wire 38 can be threaded through holes on first nut 34 and threaded through holes on second nut 36 to prevent first nut 34 and second nut 36 from undesired rotation.

Figure 3:
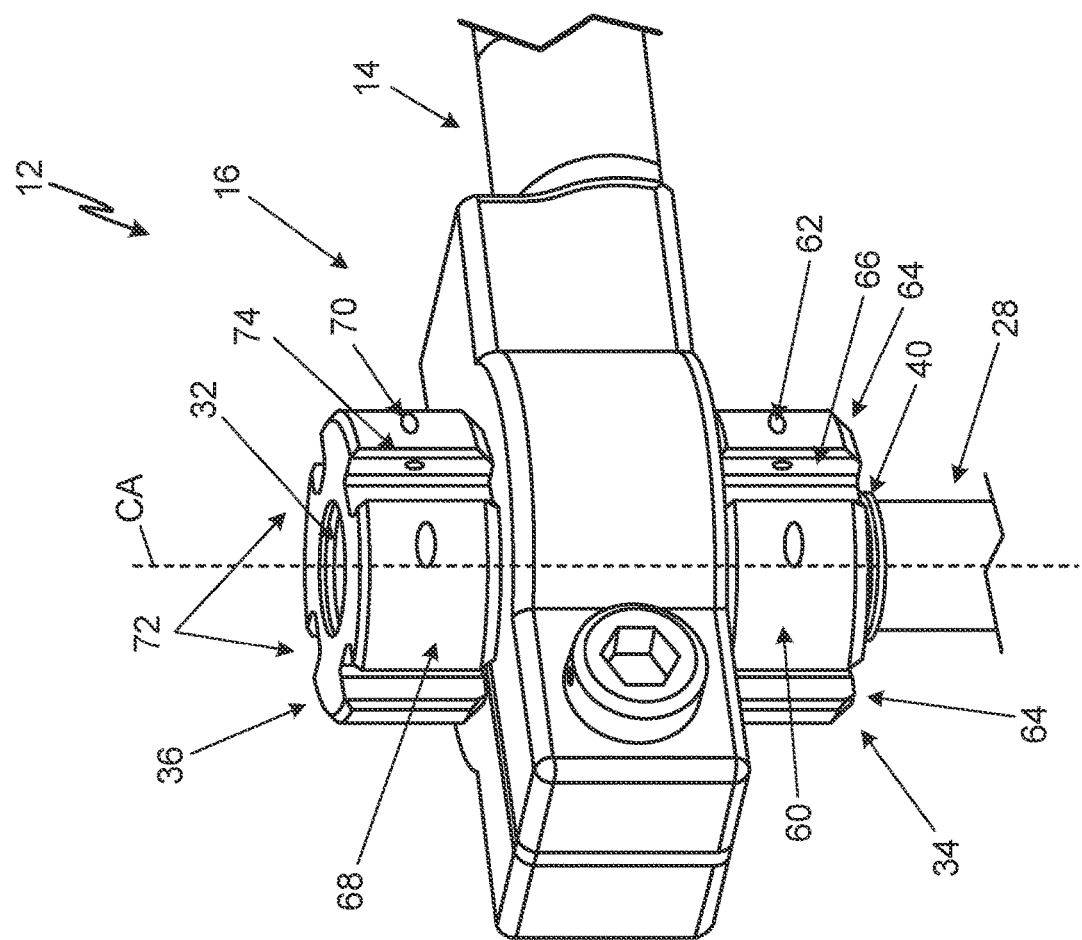
FIG. 3 is a perspective view of a wiper drive shaft, a wiper arm assembly, a first nut, and a second nut of the windshield wiper system.

FIG. 3 is perspective view of windshield wiper system 10 showing wiper arm assembly 12 assembled to wiper drive shaft 28. First nut 34 includes outer surface 60, first hole 62, and first plurality of grooves 64. Each of grooves 64 can include sidewall 66. Second nut 36 includes outer surface 68, second hole 70, and second plurality of grooves 72. Each of grooves 72 can include sidewall 74.

As discussed above with reference to FIG. 2, first end 16 of wiper arm 14 of wiper arm assembly 12 is attached to second end 32 of wiper drive shaft 28. First nut 34 is threaded to first threaded section 40. The first plurality of grooves 64 are formed in first nut 34 and are spaced equally around an outer circumference of first nut 34, creating sidewall 66 in each groove 64 of the first plurality of grooves 64. The first plurality of grooves 64 can be used by a tool to grip and turn first nut 34. First hole 62 extends from outer surface 60 of first nut 34 to sidewall 66 of one of grooves 64. More than one of first hole 62 may be formed in first nut 34.

The second plurality of grooves 72 are formed in second nut 36 and are spaced equally around an outer circumference of second nut 36, creating sidewall 74 in each groove 72 of the second plurality of grooves 72. The second plurality of grooves 72 can be used by a tool to grip and turn second nut 36. Second hole 70 extends from outer surface 68 of second nut 36 to sidewall 74 of one of grooves 72 of the second plurality of grooves 72. More than one of second hole 70 may be formed in second nut 36. Lock wire 38, shown in FIG. 2, may be fed through first hole 62 and second hole 70 before being twisted together to lock first nut 34 and second nut 36 into place. The geometries of first nut 34 and second nut 36 are not limited to the example shown in FIG. 3. In other non-limiting examples within the scope of this disclosure, first nut 34 and second nut 36 can include hex nuts, square nuts, nuts with lobed nobs, and wing nuts.

Figure 4:
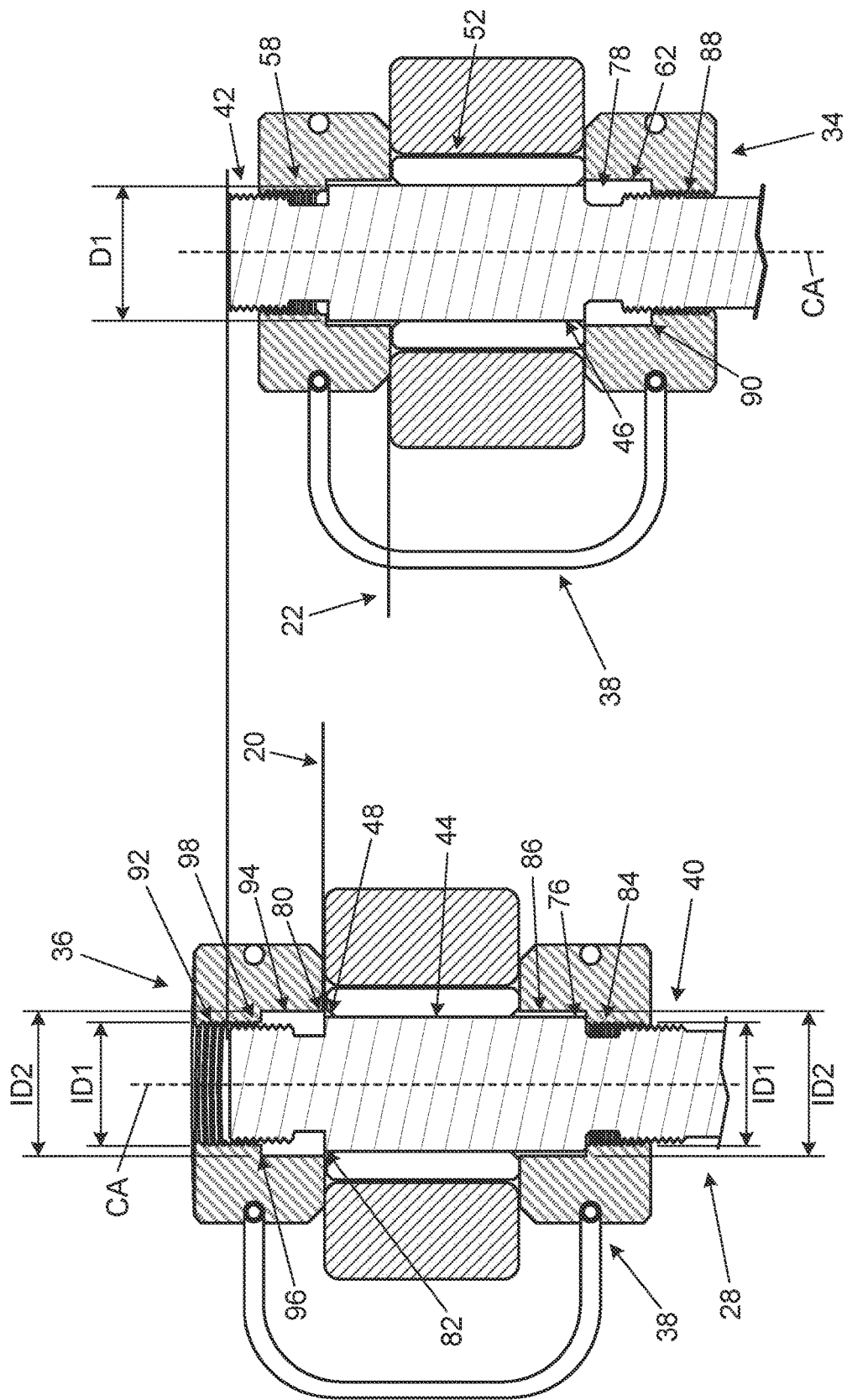
FIG. 4A is a cross-sectional view of the windshield wiper system at the minimum blade load position.
FIG. 4B is a cross-sectional view of the windshield wiper system at the maximum blade load position.

FIGS. 4A and 4B will be discussed concurrently. FIG. 4A is a cross-sectional view of WWS 10 at wiper arm minimum blade load position 20. FIG. 4B is a cross-sectional view of WWS 10 at wiper arm maximum blade load position 22. As previously noted with reference to FIG. 1, wiper arm minimum blade load position 20 shown in FIG. 4A represents a position of wiper arm 14 where a minimum blade load is applied to wiper blade 24 and windshield 26. Wiper arm maximum blade load position 22 shown in FIG. 4B represents a position of wiper arm 14 where a maximum blade load is applied to wiper blade 24 and windshield 26. These positions are noted to not be binary, as any position in between wiper arm minimum blade load position 20 and wiper arm maximum blade load position 22 may be used to vary the blade load of WWS 10. When first nut 34 and second nut 36 are adjusted up and down axially along wiper drive shaft 28, wiper arm 14 will move between wiper arm minimum blade load position 20 and wiper arm maximum blade load position 22. Further, FIGS. 4A-4B do not show wiper arm 14 outside of first end 16 of wiper arm 14 for clarity purposes.

FIGS. 4A and 4B show wiper drive shaft 28, first threaded section 40, second threaded section 42, and spline section 44 with first end 46 and second end 48. Spline section 44 has diameter D1, which is an outer diameter of spline section 44. First end 46 of spline section 44 includes first contact face 76, which can also be described as first stop face 78. Second end 48 of spline section 44 includes second contact face 80, which can also be described as second stop face 82. First nut 34 includes first inner surface 84, second inner surface 86, and first stop shelf 88 which can also be described as lip 90 of first nut 34. Second nut 36 includes first inner surface 92, second inner surface 94, and second stop shelf 96 which can also be described as lip 98 of second nut 36. First inner surface 84 of first nut 34 and first inner surface 92 of second nut 36 each include first inner diameter ID1. Second inner surface 86 of first nut 34 and second inner surface 94 of second nut 36 each include second inner diameter ID2.

At first end 46 of spline section 44, first contact face 76 faces axially towards lip 90 of first nut 34. This may also be described as first stop face 78 that faces first stop shelf 88 of first nut 34. First contact face 76 of spline section 44 includes diameter D1, which is larger in length than first inner diameter ID1 of first nut 34. First inner surface 84 is threaded to correspond with and thread onto first threaded section 40. When at wiper arm minimum blade load position 20, first contact face 76 can contact lip 90 of first nut 34. Second inner diameter ID2 of second inner surface 86 of first nut 34 is larger than diameter D1 of spline section 44, which allows second inner surface 86 to extend over spline section 44 so that first nut 34 can move axially along wiper drive shaft 28 until first contact face 76 of spline section 44 contacts lip 90 of the first nut 34.

At second end 48 of spline section 44, second contact face 80 faces axially towards lip 98 of second nut 36. This may also be described as second stop face 82 that faces second stop shelf 96 of second nut 36. Second contact face 80 of spline section 44 includes diameter D1 at an outer edge of second contact face 80. Diameter D1 is larger than first inner diameter ID1 of first inner surface 92 of second nut 36. First inner surface 92 is threaded to correspond with and thread onto second threaded section 42. When at wiper arm maximum blade load position 22, second contact face 80 can contact lip 98 of second nut 36. Second inner diameter ID2 of second inner surface 94 of second nut 36 is larger than diameter D1 of spline section 44, which allows second inner surface 94 of second nut 36 to extend over spline section 44 so that second nut 36 can move axially along wiper drive shaft 28 until second contact face 80 contacts lip 98 of second nut 36.

Varying blade load by moving wiper arm 14 axially along the wiper drive shaft 28 by threading first nut 34 and second nut 36 further axially up or down as defined by central axis CA has many advantages, including providing blade load adjustment where previously there was none, like in cantilever wiper designs. Conventional methods of adjusting blade load, such as springs and Belleville washers, increase aerodynamic drag and complexity of WWS 10. By putting a blade load adjustment mechanism on wiper drive shaft 28 and with less parts than conventional design, both complexity and drag are reduced. Additionally, first nut 34 and second nut 36 may be locked together to provide a more robust adjustable blade load. This may be accomplished with lock wire 38. The blade load is also adjustable to any position between the wiper arm minimum blade load position 20 and wiper arm maximum blade load position 22, by adjusting first nut 34 and second nut 36 axially until a desired blade load is achieved.

FIG. 5 is a perspective view of second end 32 of wiper drive shaft 28 with first threaded section 40 and second threaded section 42. FIG. 5 further shows first end 46 and second end 48 of spline section 44 with plurality of splines 50, diameter D1, and second stop face 82. First nut 34 includes plurality of grooves 64, with sidewall of a groove 66 of first plurality of grooves 64. Outer surface 60 of first nut 34 includes first hole 62. First nut 34 includes first inner surface 84 of first nut 34, second inner surface 86 of first nut 34, and first stop shelf 88.

Second end 32 of wiper drive shaft 28 is shown, with first threaded section 40, a second threaded section 42 at second end 32, and spline section 44 with first end 46 and second end 48 which is between first threaded section 40 and second threaded section 42. Plurality of splines 50 cover spline section 44. On second end 48 of spline section 44, second stop face 82 is visible. Second stop face 82 can also be described as second contact face 80. First nut 34 has first inner surface 84 which is threaded and can be threaded on first threaded section 40, and second inner surface 86 of first nut 34 which has a larger diameter than spline section 44. Between first inner surface 86 of first nut 34 and second inner surface 86, there is first stop shelf 88, which can also be described as lip 90 of first nut 34. First plurality of grooves 64 are present around outer surface 60 of first nut 34. Outer surface 60 also has first hole 62 extending from outer surface 60 into sidewall of a groove 66 of first plurality of grooves 64.

Discussion of Possible Embodiments

The following are non-exclusive descriptions of possible embodiments of the present invention.

A windshield wiper system includes a wiper drive shaft with a first end and a second end. The second end includes a first threaded section between the first end and the second end, a second threaded section extending axially along the wiper drive shaft between the first threaded section and the second end relative to a center axis of the wiper drive shaft, and a spline section axially between the first threaded section and the second threaded section. A first nut is configured to thread onto the first threaded section, and a second nut is configured to thread onto the second threaded section. A wiper arm assembly includes an adjustment sleeve that interlocks to the spline section. The wiper arm assembly includes a first end that encloses the adjustment sleeve. A second end of the wiper arm is attach to a wiper blade.

The windshield wiper system of the preceding paragraph can optionally include, additionally and/or alternatively, any one or more of the following features, configurations and/or additional components:

the first nut and the second nut each comprise: a first inner surface with a first inner diameter, wherein the first inner surface is threaded; a second inner surface with a second inner diameter, wherein the second inner diameter is larger than the first inner diameter; and a lip axially between the first inner surface and the second inner surface and extending radially from the second inner surface to the first inner surface;

the second inner diameter is larger than a diameter of the spline section;

the wiper drive shaft further comprises: a first contact face at a first end of the spline section, wherein the first contact face faces axially toward the lip of the first nut when the first nut is threaded onto the first threaded section of the wiper drive shaft, wherein the first contact face is smaller in diameter than the second inner diameter of the first nut, and wherein the first contact face is larger in diameter than the first inner diameter of the first nut; and second contact face at a second end of the spline section, wherein the second contact face faces axially toward the lip of the second nut when the second nut is threaded onto the second threaded section of the wiper drive shaft, wherein the second contact face is smaller in diameter than the second inner diameter of the second nut, and wherein the second contact face is larger in diameter than the first inner diameter of the second nut;

the spline section of the wiper drive shaft comprises: a plurality of splines arranged circumferentially about the center axis of the wiper drive shaft, wherein each spline of the plurality of splines extends axially from the first contact face to the second contact face;

the first nut further comprises a first plurality of grooves extending radially inward from an outer surface of the first nut, and wherein the grooves of the first plurality of grooves are equally spaced circumferentially about the first nut; and the second nut further comprises a second plurality of grooves extending radially inward from an outer surface of the second nut, and wherein the grooves of the second plurality of grooves are equally spaced circumferentially about the second nut;

the first nut further comprises a first hole extending from the outer surface of the first nut to a radially-extending side surface of a groove of the first plurality of grooves; and the second nut further comprises a second hole extending from the outer surface of the second nut to a radially-extending side surface of a groove of the second plurality of grooves;

a lock wire is configured to pass through the first hole in the first nut and the second hole in the second nut to lock the first nut and the second nut together; and/or the spline section has an axial length that is longer than an axial length of the adjustment sleeve and longer than an axial width of the first end of the wiper arm.

A windshield wiper system for an aircraft includes a wiper drive shaft with a first end and a second end that is opposite the first end and spaced axially from the first end relative to a center axis of the wiper drive shaft. The second end further includes a first threaded section between the first end and the second end, a second threaded section axially between the first threaded section and the second end, and a spline section between the first threaded section and the second threaded section. The spline section may include a plurality of splines extending axially along the wiper drive shaft relative to the center axis of the wiper drive shaft, a first stop face at a first end of the plurality of splines and oriented perpendicular to the center axis of the wiper drive shaft, and a second stop face at a second end of the plurality of splines and oriented perpendicular to the center axis of the wiper drive shaft. A first nut may be configured to thread to the first threaded section and includes a first stop shelf configured to contact the first stop face. A second nut may be configured to thread to the second threaded section and includes a second stop shelf configured to contact the second stop face. A wiper arm assembly may include an adjustment sleeve configured to contact the plurality of splines, a wiper arm with a first end configured to enclose the adjustment sleeve, and a second end of the wiper arm is attached to a wiper blade.

The windshield wiper system of the preceding paragraph can optionally include, additionally and/or alternatively, any one or more of the following features, configurations and/or additional components:

the first nut comprises: a first inner surface with a first inner diameter, wherein the first inner surface is threaded; and a second inner surface with a second inner diameter, wherein the second inner diameter is larger than the first inner diameter, and wherein the first stop shelf of the first nut is axially between the first inner surface and the second inner surface and extends radially from the second inner surface to the first inner surface;

the second nut comprises: a first inner surface with a first inner diameter, wherein the first inner surface of the second nut is threaded; and a second inner surface with a second inner diameter, wherein the second inner diameter of the second nut is larger than the first inner diameter of the second nut, and wherein the second stop shelf of the second nut is axially between the first inner surface of the second nut and the second inner surface of the second nut and extends radially from the second inner surface of the second nut to the first inner surface of the second nut;

the second inner diameter of the first nut and the second inner diameter of the second nut are both larger than a diameter of the spline section;

the first nut further comprises a first plurality of grooves formed in an outer surface of the first nut and equally spaced around an outer circumference of the first nut; and the second nut further comprises a second plurality of grooves formed in an outer surface of the second nut and equally spaced around an outer circumference of the second nut;

a first hole in the first nut extends from the outer surface of the first nut to a sidewall of a groove of the first plurality of grooves; and a second hole in the second nut extends from the outer surface of the second nut to a sidewall of a groove of the second plurality of grooves;

a lock wire passes through the first hole and the second hole and rotationally locks the first nut and the second nut together;

the spline section has a length longer than a length of the adjustment sleeve and longer than a width of the first end of the wiper arm;

the wiper arm is a cantilever design;

a position of the wiper arm varies and a blade load of the wiper blade varies as the first nut and the second nut are moved axially along the wiper drive shaft; and/or the adjustment sleeve comprises a plurality of internal splines, and a plurality of external splines.

While the invention has been described with reference to an exemplary embodiment(s), it will be understood by those skilled in the art that various changes may be made and equivalents may be substituted for elements thereof without departing from the scope of the invention. For example, while FIGS. 2-4B show adjustment sleeve 52 between first end 16 of blade arm 14 and spline section 54, in other examples adjustment sleeve 52 can be omitted and internal splines on first end 16 can mesh directly with spline section 54. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system for an aircraft comprising:
   a wiper drive shaft comprising:

a first end of the wiper drive shaft; and
a second end opposite the first end, the second end comprising:
  a first threaded section between the first end and the second end;
  a second threaded section extending axially along the wiper drive shaft between the first threaded section and the second end relative to a center axis of the wiper drive shaft; and
  a spline section, wherein the spline section is axially between the first threaded section and the second threaded section;
a first nut configured to thread onto the first threaded section;
a second nut configured to thread onto the second threaded section; and
a wiper arm assembly comprising;
  an adjustment sleeve configured to interlock with the spline section;
  a wiper arm with a first end configured to enclose the adjustment sleeve; and
  a second end of the wiper arm attached to a wiper blade.

2. The system of claim 1, wherein the first nut and the second nut each comprise:
a first inner surface with a first inner diameter, wherein the first inner surface is threaded;
a second inner surface with a second inner diameter, wherein the second inner diameter is larger than the first inner diameter; and
a lip axially between the first inner surface and the second inner surface and extending radially from the second inner surface to the first inner surface.

3. The system of claim 2, wherein the second inner diameter is larger than a diameter of the spline section.

4. The system of claim 3, wherein the wiper drive shaft further comprises:
a first contact face at a first end of the spline section, wherein the first contact face faces axially toward the lip of the first nut when the first nut is threaded onto the first threaded section of the wiper drive shaft, wherein the first contact face is smaller in diameter than the second inner diameter of the first nut, and wherein the first contact face is larger in diameter than the first inner diameter of the first nut; and
second contact face at a second end of the spline section, wherein the second contact face faces axially toward the lip of the second nut when the second nut is threaded onto the second threaded section of the wiper drive shaft, wherein the second contact face is smaller in diameter than the second inner diameter of the second nut, and wherein the second contact face is larger in diameter than the first inner diameter of the second nut.

5. The system of claim 4, wherein the spline section of the wiper drive shaft comprises:
a plurality of splines arranged circumferentially about the center axis of the wiper drive shaft, wherein each spline of the plurality of splines extends axially from the first contact face to the second contact face.

6. The system of claim 1, wherein:
the first nut further comprises a first plurality of grooves extending radially inward from an outer surface of the first nut, and wherein the grooves of the first plurality of grooves are equally spaced circumferentially about the first nut; and
the second nut further comprises a second plurality of grooves extending radially inward from an outer surface of the second nut, and wherein the grooves of the second plurality of grooves are equally spaced circumferentially about the second nut.

7. The system of claim 6, wherein:
the first nut further comprises a first hole extending from the outer surface of the first nut to a radially-extending side surface of a groove of the first plurality of grooves; and
the second nut further comprises a second hole extending from the outer surface of the second nut to a radially-extending side surface of a groove of the second plurality of grooves.

8. The system of claim 7, further comprising a lock wire configured to pass through the first hole in the first nut and the second hole in the second nut to lock the first nut and the second nut together.

9. The system of claim 1, wherein the spline section has an axial length that is longer than an axial length of the adjustment sleeve and longer than an axial width of the first end of the wiper arm.

10. A windshield wiper system for an aircraft comprising:
a wiper drive shaft comprising:
  a first end of the wiper drive shaft;
  a second end opposite the first end and spaced axially from the first end relative to a center axis of the wiper drive shaft, the second end comprising:
    a first threaded section between the first end and the second end;
    a second threaded section axially between the first threaded section and the second end; and
    a spline section between the first threaded section and the second threaded section, wherein the spline section comprises:
      a plurality of splines extending axially along the wiper drive shaft relative to the center axis of the wiper drive shaft;
      a first stop face at a first end of the plurality of splines and oriented perpendicular to the center axis of the wiper drive shaft; and
      a second stop face at a second end of the plurality of splines and oriented perpendicular to the center axis of the wiper drive shaft;
a first nut configured to thread to the first threaded section and comprising a first stop shelf configured to contact the first stop face;
a second nut configured to thread to the second threaded section and comprising a second stop shelf configured to contact the second stop face; and
a wiper arm assembly comprising:
  an adjustment sleeve configured to contact the plurality of splines; and
  a wiper arm with a first end configured to enclose the adjustment sleeve;
  a second end of the wiper arm attached to a wiper blade.

11. The system of claim 10, wherein the first nut comprises:
a first inner surface with a first inner diameter, wherein the first inner surface is threaded; and
a second inner surface with a second inner diameter, wherein the second inner diameter is larger than the first inner diameter, and
wherein the first stop shelf of the first nut is axially between the first inner surface and the second inner surface and extends radially from the second inner surface to the first inner surface.

12. The system of claim 11, wherein the second nut comprises:

a first inner surface with a first inner diameter, wherein the first inner surface of the second nut is threaded; and a second inner surface with a second inner diameter, wherein the second inner diameter of the second nut is larger than the first inner diameter of the second nut, and wherein the second stop shelf of the second nut is axially between the first inner surface of the second nut and the second inner surface of the second nut and extends radially from the second inner surface of the second nut to the first inner surface of the second nut.

13. The system of claim 11, wherein the second inner diameter of the first nut and the second inner diameter of the second nut are both larger than a diameter of the spline section.

14. The system of claim 13, wherein:

the first nut further comprises a first plurality of grooves formed in an outer surface of the first nut and equally spaced around an outer circumference of the first nut; and the second nut further comprises a second plurality of grooves formed in an outer surface of the second nut and equally spaced around an outer circumference of the second nut.

15. The system of claim 14, further comprising:

a first hole in the first nut extending from the outer surface of the first nut to a sidewall of a groove of the first plurality of grooves; and a second hole in the second nut extending from the outer surface of the second nut to a sidewall of a groove of the second plurality of grooves.

16. The system of claim 15, further comprising a lock wire passing through the first hole and the second hole and rotationally locking the first nut and the second nut together.

17. The system of claim 10, wherein the spline section has a length longer than a length of the adjustment sleeve and longer than a width of the first end of the wiper arm.

18. The system of claim 10, wherein the wiper arm is a cantilever design.

19. The system of claim 10, wherein a position of the wiper arm varies and a blade load of the wiper blade varies as the first nut and the second nut are moved axially along the wiper drive shaft.

20. The system of claim 10, wherein the adjustment sleeve comprises a plurality of internal splines, and a plurality of external splines.

* * * * *